June 9, 1959 R. W. STELZEL ET AL 2,889,905
COUPLING APPARATUS
Filed Dec. 1, 1955 2 Sheets-Sheet 2
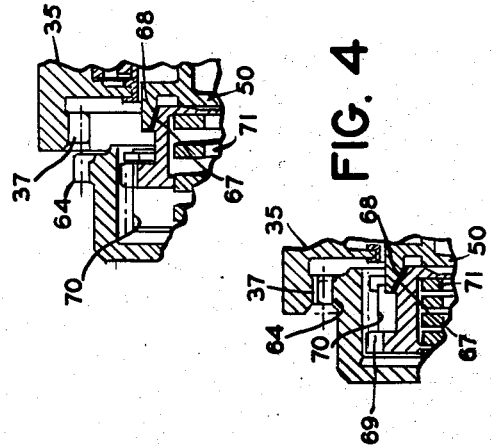
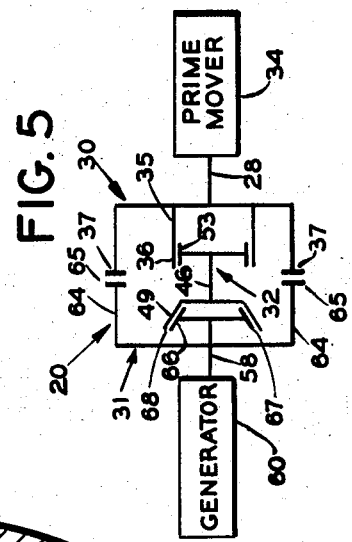
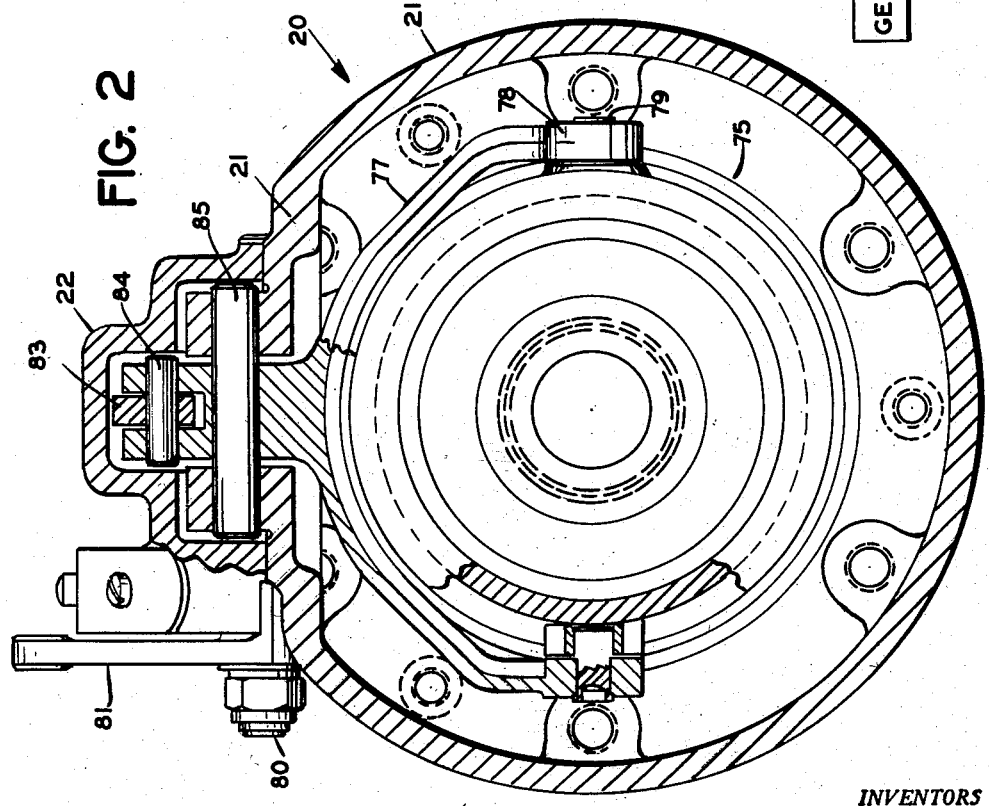
INVENTORS
RODERICK W. STELZEL
HENRY TROEGER
BY
ATTORNEY

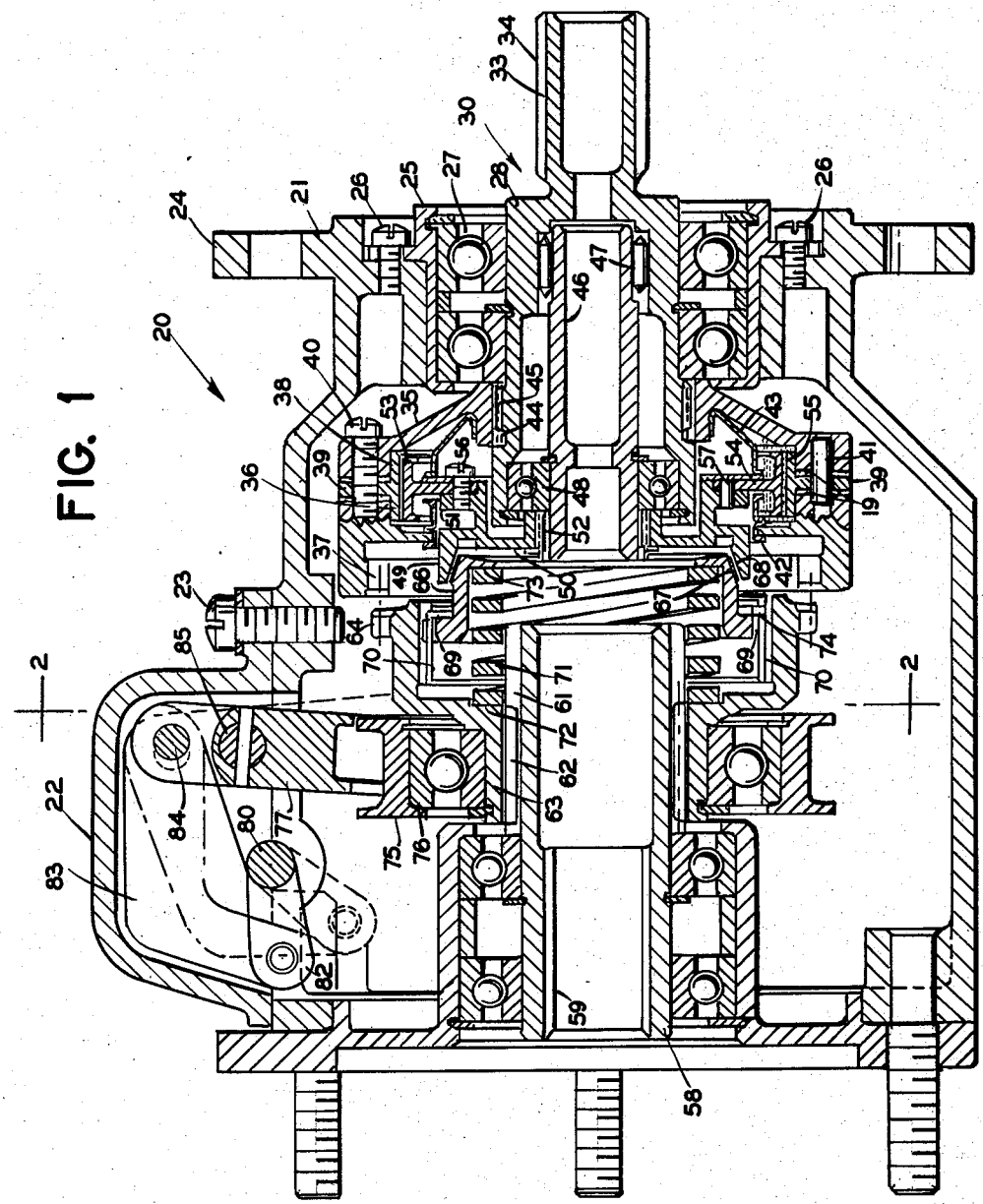

United States Patent Office 2,889,905
Patented June 9, 1959

2,889,905

COUPLING APPARATUS

Roderick W. Stelzel, Hohokus, and Henry Troeger, Ramsey, N.J., assignors to Bendix Aviation Corporation, Teterboro, N.J., a corporation of Delaware Application December 1, 1955, Serial No. 550,315

3 Claims. (Cl. 192—48)

This invention pertains to coupling apparatus and more particularly to a viscous drag coupling usable independently or in a composite clutch mechanism.

In aircraft, and other installations, it is frequently required to engage rotating machinery, such as an engine, with a second device, such as a generator, having an armature which is not rotating. When the prime mover or engine is constantly in operation, the problem exists as to how the prime mover may be coupled in direct engagement with machinery to be driven while providing smooth operation and without causing inertia induced damage.

Heretofore, there have been many attempts to provide equipment for coupling a device having high inertia to another device without inducing high shock and undue torque loads. It is extremely difficult to avoid chatter on engagement of the conventional friction clutch over a wide speed range. The present invention employs a viscous drag coupling, and in one arrangement utilizes a conventional friction clutch coupled with a novel viscous fluid clutch arrangement to provide a smooth operating clutch mechanism that is free of chatter and vibration and yet may be utilized as power transmitting apparatus to couple devices operating over a wide speed range.

It is an object of the present invention to provide novel mechanical means for coupling a driving device to a second device with a minimum of shock and torque overload.

Another object is the provision of novel viscous fluid coupling between input and output devices.

It is another object of the invention to provide novel mechanical means for coupling a driving element with an element to be driven by utilizing novel clutch means.

A further object of the invention is to provide a coupling mechanism for coupling a driving element to an element to be driven by utilizing several clutch mechanisms one of which is a novel viscous fluid drag clutch.

A further object of the invention is to provide a novel clutch assembly interposed between a prime mover and a device to be driven, and wherein said clutch assembly includes a friction clutch and a viscous drag clutch having a pair of coaxial cylinders whereby the accelerating force to rotate the driven device is that which is transmitted by the shear developed in the viscous fluid between the coaxial cylinders as a result of relative motion between said cylinders.

The present invention contemplates a viscous drag clutch having opposed coaxial cylinders disposed in spaced relation and with a viscous fluid, such as a silicone liquid, disposed contiguous the cylinder surfaces, one of which is steel and the other aluminum. Normally, both cylinders rotate when the input cylinder is rotated. When the input cylinder is rotated and an operating load is connected to the output cylinder, the output cylinder is slowed down, thereby causing the fluid shear to increase in temperature and expand the output cylinder having a rate of expansion different than the input cylinder, which consequently increases the drag between said cylinders and causes said output cylinder to increase speed until substantially synchronization exists between said input and output cylinders.

Further, the present invention contemplates a composite clutch mechanism for coupling an input prime mover or driving device to an output or driven device. The clutch mechanism, in one arrangement as presented herein, utilizes two cooperating clutch arrangements, including a cone friction clutch and a viscous drag clutch, both cooperating with a positive coupling element or positive drive therebetween. The viscous drag clutch utilizes inner and outer coaxial cylinders with a viscous fluid which may be a silicone liquid disposed therebetween. In one arrangement, the outer cylinder of the viscous drag clutch is made of steel and the inner cylinder is made of aluminum. Normally, when the operating prime mover is connected to the outer cylinder, and said inner cylinder is not connected to an operating load, both cylinders rotate together, since the inner cylinder is coupled by the viscous fluid with the outer cylinder. As soon as the spaced elements of the cone friction clutch engage each other at the initial operating interval, the external load on the aluminum cylinder of the viscous drag clutch causes it to slow down thereby causing high relative motion between its inner and outer coaxial cylinders resulting in a high rate of shear of the fluid in the clutch. Since its inner cylinder is made of a higher expansive material than the outer cylinder, the heat thus developed by the viscous fluid shear causes the inner cylinder to expand at a more rapid rate than the outer cylinder thereby resulting in a decrease of the clearance between said cylinders and an increase in speed, accordingly, of the inner cylinder. As the speed of the driven element approaches synchronization with the driving element, a positive drive clutch actuator is fully actuated to cause positive interengagement between the driving and driven elements thereby providing direct positive coupling.

The foregoing and other objects and advantages of the invention will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

In the drawings:

Fig. 1 is a sectional elevational view of the clutch mechanism of the invention.

Fig. 2 is a vertical cross sectional view taken along lines 2—2 of Fig. 1.

Fig. 3 is a partial sectional view of the cone clutch with the positive drive clutch elements disengaged.

Fig. 4 is a view similar to Fig. 3 wherein the positive drive clutch elements are shown fully engaged.

Fig. 5 is a representative schematic diagram of the detailed view of Fig. 1 and shows the viscous drag clutch and the cone clutch relative to the positive drive elements connecting both of said clutches to the driving and driven elements.

Referring to the drawings, more particularly to Fig. 1, there is shown a clutch mechanism 20 having a clutch mechanism housing 21 with a housing cap 22 secured by screws 23 to the main housing 21. A mounting flange 24 is formed on one end of the housing and has a bearing sleeve 25 secured thereto by screws 26 for retaining bearings such as 27 in position relative to a hollow input shaft 28.

For the sake of description, the clutch mechanism 20 may be considered as having three major assemblies, namely an input assembly 30, an output assembly 31, and an intermediate assembly 32, as will be clearly seen in the representative schematic drawing shown in Fig. 5.

The input assembly has a hollow input shaft 28 which is mounted in the mounting flange 24 by way of the bearing assembly 27. The hollow input shaft 28 has an outer end 33 which has spline teeth 34 thereon for engagement with a complemental shaft portion of the prime mover 34. The hollow input shaft 28 has secured thereon a viscous clutch housing 35 which carries the outer viscous clutch member 36 and the positive drive internal tooth member 37. The outer viscous clutch member 36 has a cylindrical face portion 38 with a web 39 which is annular and disposed normal to the cylindrical face portion so that the outer viscous clutch member 36 and the positive drive internal tooth element 37 may be secured to the viscous clutch housing 35 by any convenient means such as screws 40 and dowels 41. A pair of annular splash rings 42 and 43 are secured on the input assembly 30 to retain fluid for the viscous drag clutch relative to the inner and outer operating surfaces of the viscous drag clutch. Flange portions of the respective splash rings are annular and are disposed close to the respective surfaces of the web 54 but slightly spaced therefrom. Leak-proof seal rings 19 are disposed between the web 39 and the inner viscous clutch member to provide a tight liquid seal.

The inner portion of the viscous clutch housing 35 has splines 44 thereon which engage with complemental splines 45 formed on the exterior of the hollow input shaft 28 so that as the outer end 33 of the input shaft 28 is rotated the entire input assembly 30 will be rotated.

The intermediate assembly 32 has an internal input sleeve 46 which is disposed within the hollow input shaft 28 and is revolubly mounted by bearing assemblies such as 47 which are disposed between the input sleeve and the hollow input shaft at one end thereof with another bearing assembly 48 mounted between the opposite end of the hollow input shaft and the internal input sleeve 46. The intermediate assembly 32 has an outer cone friction clutch member 49 connected with flange portions 50 and 51 to provide connections with the internal input sleeve 46 via complemental splines 52, and the inner viscous clutch member 53. A web 54, which is annular, is disposed normal to the cylindrical face portion 55 of the inner viscous clutch member 53. Screws 56 and dowels 57 secure the web 54 of the inner viscous clutch member 53 to the flange portion 51. From the foregoing it will be seen that the inner assembly 32 is relatively movable in relation to the input assembly 30, and that the input assembly 30 is also movable in relation to the clutch mechanism housing 21.

The output assembly 31 has a hollow output shaft 58 which has an internal spline 59 for engagement with a complemental member of an output device such as the generator 60 shown in Fig. 5. The inner end of the hollow output shaft 58 has external splines 61 thereon which engage with internal splines 62 formed on the axially movable sleeve 63 which carries the positive drive external tooth element 64, which has individually splined teeth such as 65.

The positive drive external tooth element 64 carried by the axially movable sleeve 63 and the positive drive internal tooth element 37 carried by the viscous clutch housing 35 are actually internal and external involute splines and form the positive drive coupling between the input assembly 30 and the outer assembly 31.

An inner cone friction clutch member 66 has a face 67 which is complemental to the face 68 carried by the outer cone friction clutch member 49. Inner cone friction clutch member 66 has the face 67 of the inner cone friction clutch on one peripheral edge thereof and has external splines 69 formed on the opposite end thereof, which splines engage with the internal teeth of the complemental involute spline 70 formed on the axially movable sleeve 63. The splines 69 and 70 permit relative axial movement between axially movable sleeve 63 and the inner cone friction clutch member 66 under influence of the helical compression spring 71 which is disposed externally of the hollow output shaft 58 between opposed spring engaging faces 72 and 73 of the axial movable sleeve 63 and the inner cone friction clutch member 66 with the external involute spline 69 engaging the retaining or snap ring 74 which is secured in the externally movable sleeve 63 to limit the movement of the inner cone friction clutch member toward the outer cone friction clutch member 49 unless the axially movable sleeve 63 is also moved toward the outer cone friction clutch.

The axially movable sleeve 63 has its axial movement controlled by an annular cage 75 carrying shaft bearing 76 for engagement with the axially movable sleeve 63. A shifting yoke 77 is bifurcated so that bearing portions 78 thereof engage pins such as 79 which are carried by the cage 75 for moving the externally movable sleeve 63 by a lever arrangement operated externally of the clutch mechanism housing 21.

The operating lever shaft 80 is pivotally mounted to the housing and carries the operating lever 81, shown in the enlarged view of Fig. 2. A link 82 is pivoted on the shaft 80 at one end thereof with the opposite end of said link being connected to a lever 83 at one end thereof, with the opposite end of said lever 83 being connected to the pin 84 which pin is shown connected to the upper end of the shifting yoke 77, with said yoke being pivotally mounted on the yoke pin shaft 85 (Fig. 2) which is mounted in the clutch mechanism housing 21.

From the foregoing it will be seen that the clutch mechanism 20 has an input assembly, an output assembly, and an intermediate assembly. The input assembly and the intermediate assembly are engageable by a viscous drag clutch arrangement, and the output assembly is also engageable with the intermediate assembly by a friction clutch of the cone type. A viscous liquid which may be any suitable type that can provide proper operation of the device is employed for wetting the surfaces of the viscous drag clutch. One form of the preferable liquids usable in the viscous drag clutch and having a suitable viscosity is a silicone fluid which is placed inside of the splash rings so when the clutch mechanism is at rest the bulk of the viscous fluid will be in the well area provided by the housing and the splash rings at the bottom of the device so normally the viscous fluid will be between the surfaces of the inner and outer coaxial cylinders of the viscous drag clutch whereby said surfaces will be properly wetted.

The viscous drag clutch consists primarily of two coaxial cylinders with a small radial clearance, mounted in a manner to allow either cylinder to rotate independently of the other. The void between the two cylinders is filled with a fluid of high viscosity. It is the viscous resistance offered by the fluid to relative movement of its parts that is utilized to accelerate the unloaded generator or alternator armature. The inner member is made of a material (aluminum) which has a higher coefficient of expansion than the steel outer cylinder. Heat generated by shearing the viscous film when one cylinder is rotated relative to the other, will cause the inner cylinder to expand more rapidly than the outer, thereby decreasing the initially assembled radial clearance between the cylinders to a very small clearance and possible metal to metal contact.

The torque of a unit of this type will vary directly as the viscousity of the fluid and the difference in speed and inversely as the radial clearance.

By using viscous shear for acceleration, torque variations are smooth and do not produce impulses which could excite damaging vibrations in an oscillatable system such as a generator with a quill shaft.

Although but a single embodiment of the invention has been illustrated and described in detail, it is to be expressly understood that the invention is not limited thereto. Various changes may also be made in the

What is claimed is:

1. A clutch mechanism having an input assembly, an output assembly, and an intermediate assembly, friction clutch means having opposed surfaces carried by, respectively, said output assembly and said intermediate assembly, positive coupling means carried by said input assembly and said output assembly for providing a positive drive therebetween, operable means to effect engagement of said friction clutch means and thereafter subsequent engagement of said positive coupling means, and opposed surfaces in spaced relation carried by, respectively, said intermediate assembly and said input assembly and mounted for relative movement, the last said opposed surfaces being made of, respectively, material having rates of expansion different from one another upon an increase in temperature, and a viscous coupling liquid disposed between the last said opposed surfaces, the last said opposed surfaces being arranged in such a manner that the drag of the viscous liquid due to shear thereof upon engagement of the friction clutch means and application of an operating load on the output assembly effects a temperature increase in the viscous liquid to cause one of said opposed surfaces to expand toward the other and thereby increase the torque between the input and output assemblies so as to attain substantial synchronism between the input and output assemblies for the subsequent engagement of said positive drive coupling means.

2. A clutch mechanism having an input assembly, an output assembly, and an intermediate assembly, friction clutch means having opposed surfaces carried by, respectively, said output assembly and said intermediate assembly, positive coupling means carried by said input assembly and said output assembly for providing a positive drive therebetween, operable means to effect engagement of said friction clutch means and thereafter subsequent engagement of said positive coupling means, a variable coupling means operably connected between said input assembly and intermediate assembly, and means to increase the torque capacity of said variable coupling means upon engagement of the friction clutch means so as to attain substantial synchronism between the input and output assemblies before the subsequent engagement of said positive drive coupling means.

3. A clutch mechanism having an input assembly, an output assembly, and an intermediate assembly, friction clutch means having opposed surfaces carried by, respectively, said output assembly and said intermediate assembly, positive coupling means carried by said input assembly and said output assembly for providing a positive drive therebetween, operable means to effect engagement of said friction clutch means and thereafter subsequent engagement of said positive coupling means, a variable coupling means operably connected between said input assembly and intermediate assembly, said variable coupling means including a pair of cylindrical elements, one of the cylindrical elements being positioned within the other of the cylindrical elements, said cylindrical elements being rotatable relative one to the other, a viscous fluid for drivingly coupling said elements and whereby upon relative movement of said elements, shear of said viscous fluid causes a temperature increase in said fluid, said one cylindrical element being of a material dissimilar from the material of said other element and the material of said one element having a higher temperature coefficient of expansion than the material of said other element so that the increase in the temperature of the viscous fluid effects a differential expansion of said one element relative to an inner surface of said other cylindrical element due to said increase in temperature so as to cause said one element to substantially engage the inner surface of said other element so as to increase the torque capacity of said variable coupling means upon engagement of the friction clutch means to attain substantial synchronism between the input and output assemblies before the subsequent engagement of said positive drive coupling means.

References Cited in the file of this patent

UNITED STATES PATENTS

| | | |
|---|---|---|
| 1,928,301 | Pierson | Sept. 26, 1933 |
| 2,001,762 | Blood | May 21, 1935 |
| 2,046,723 | Brownscombe | July 7, 1936 |
| 2,087,488 | Stanley | July 20, 1937 |
| 2,250,656 | Schjolin | July 29, 1941 |
| 2,253,001 | Webb et al. | Aug. 19, 1941 |
| 2,264,478 | Lowther | Dec. 2, 1941 |
| 2,502,461 | Kane | Apr. 4, 1950 |
| 2,671,543 | Bosch | Mar. 9, 1954 |
| 2,699,846 | Pitman et al. | Jan. 18, 1955 |
| 2,708,018 | Dudley | May 10, 1955 |